United States Patent Office 3,321,672
Patented May 23, 1967

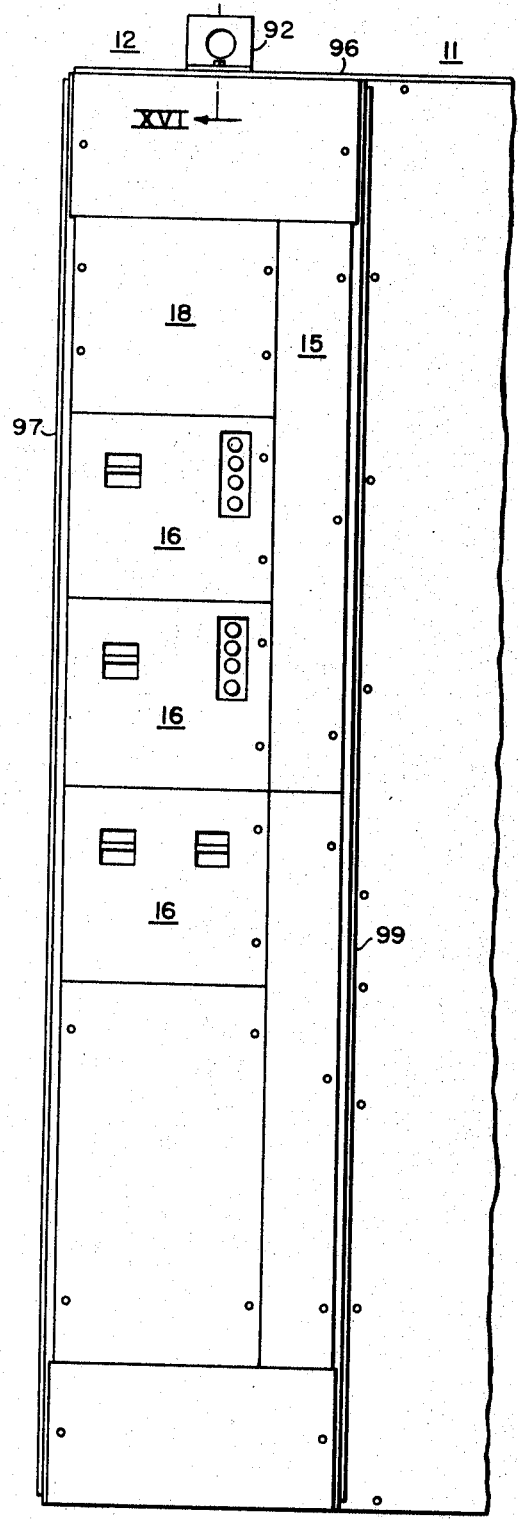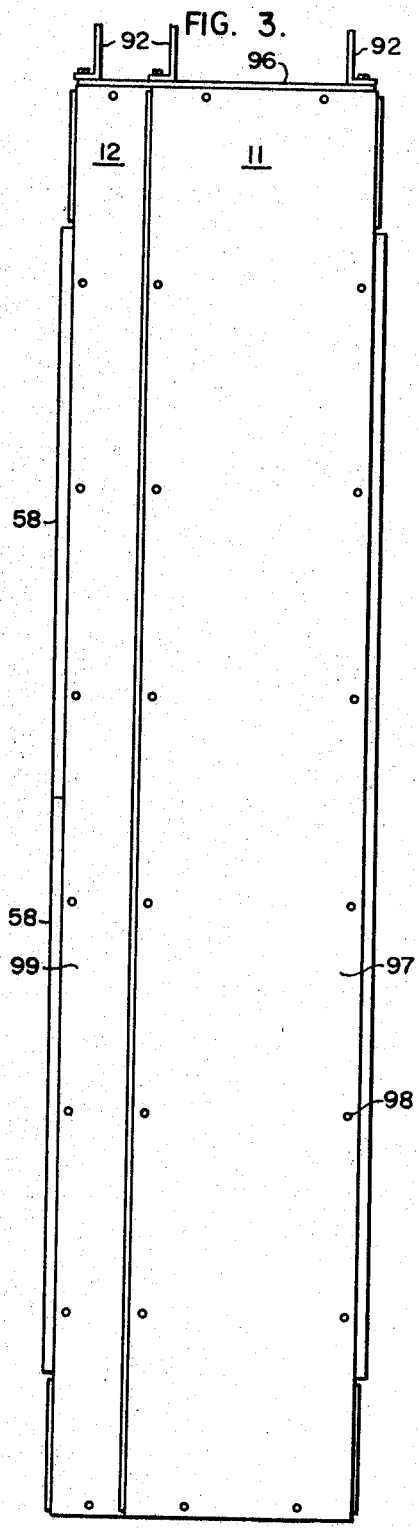

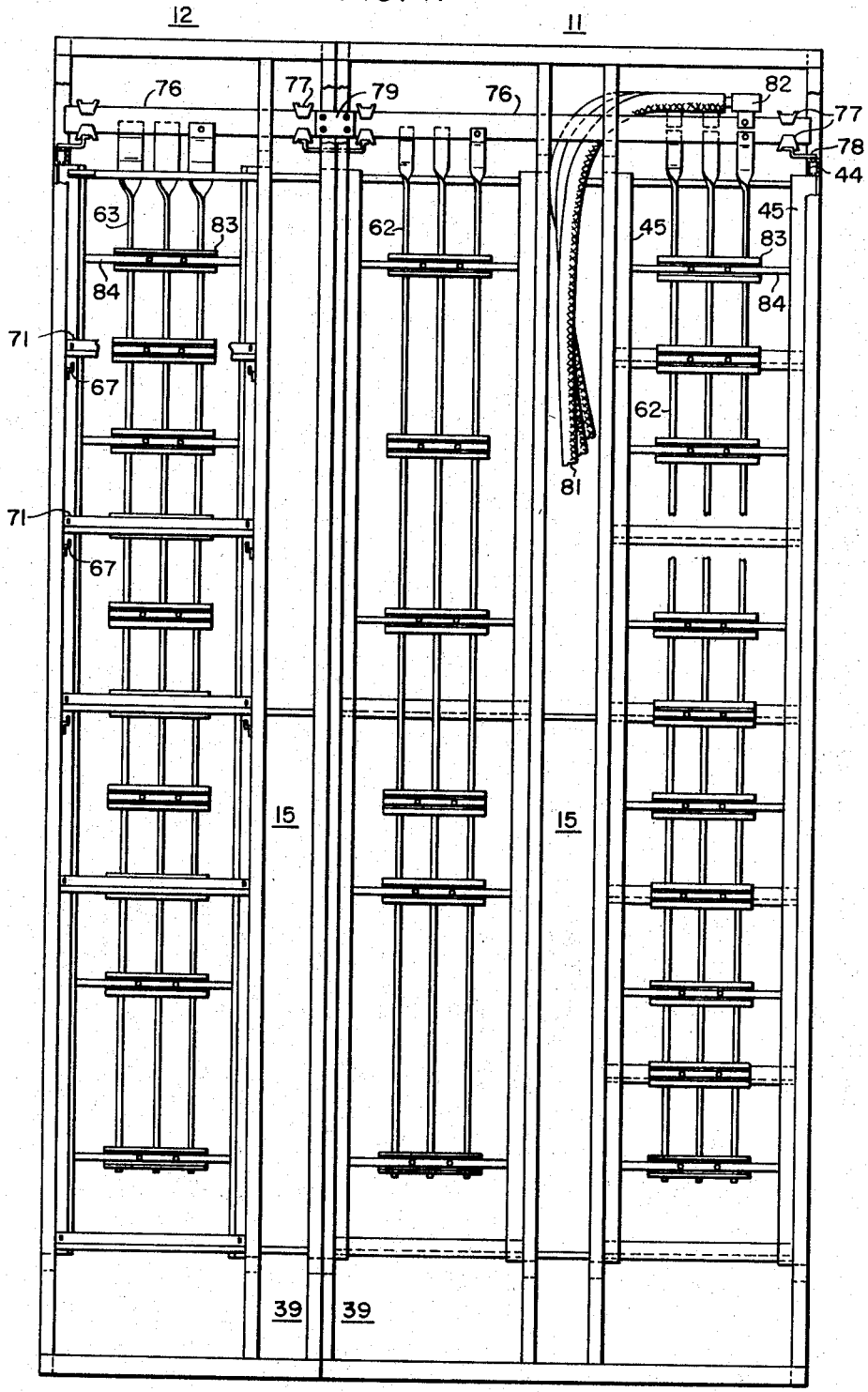

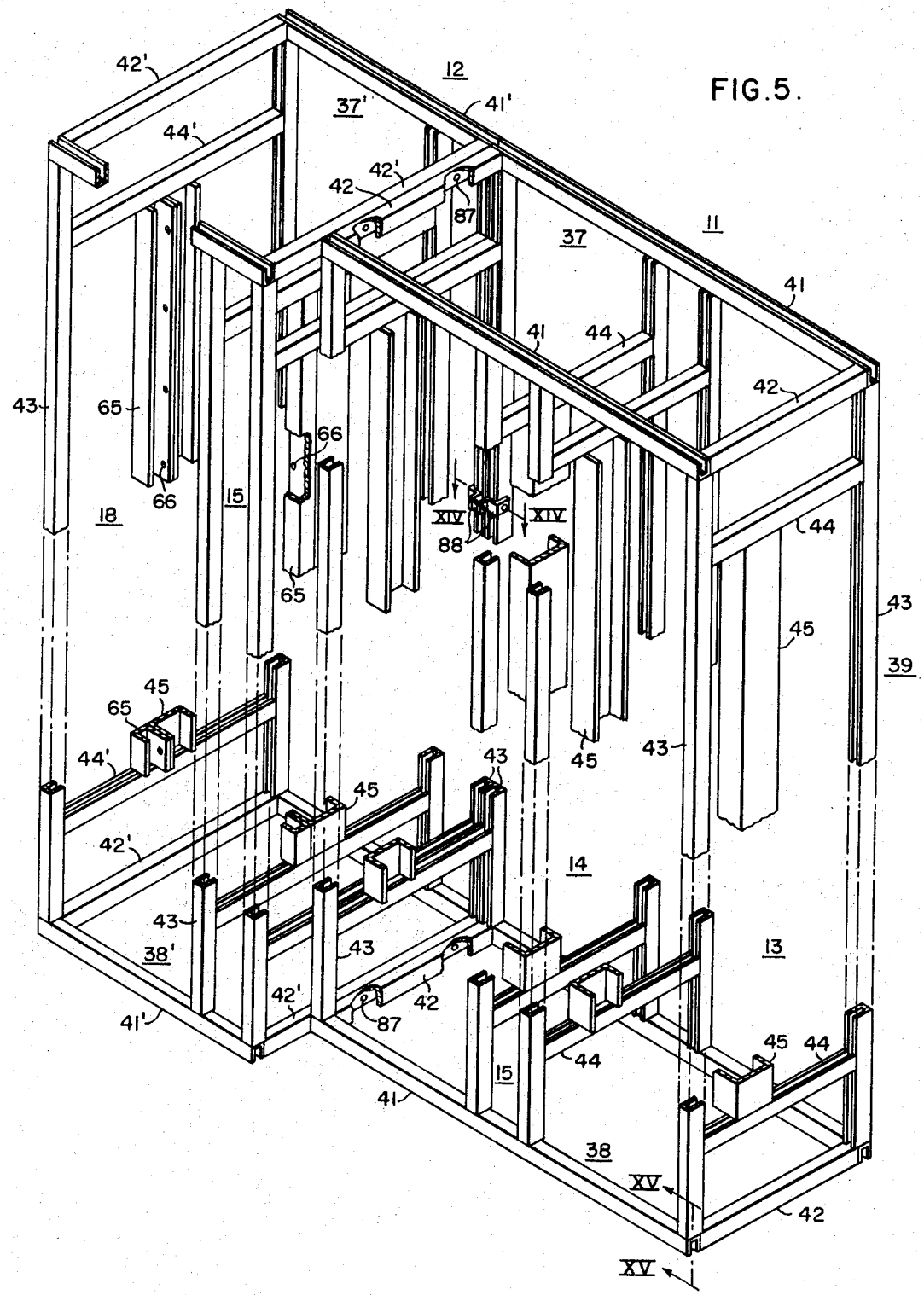

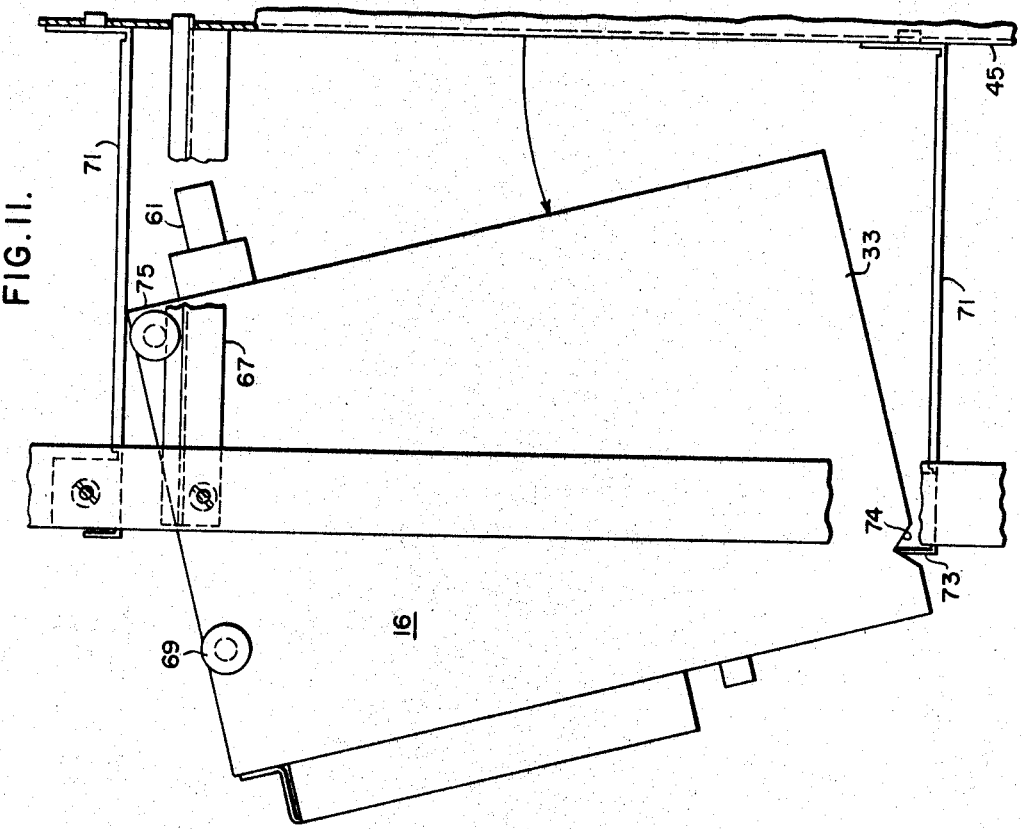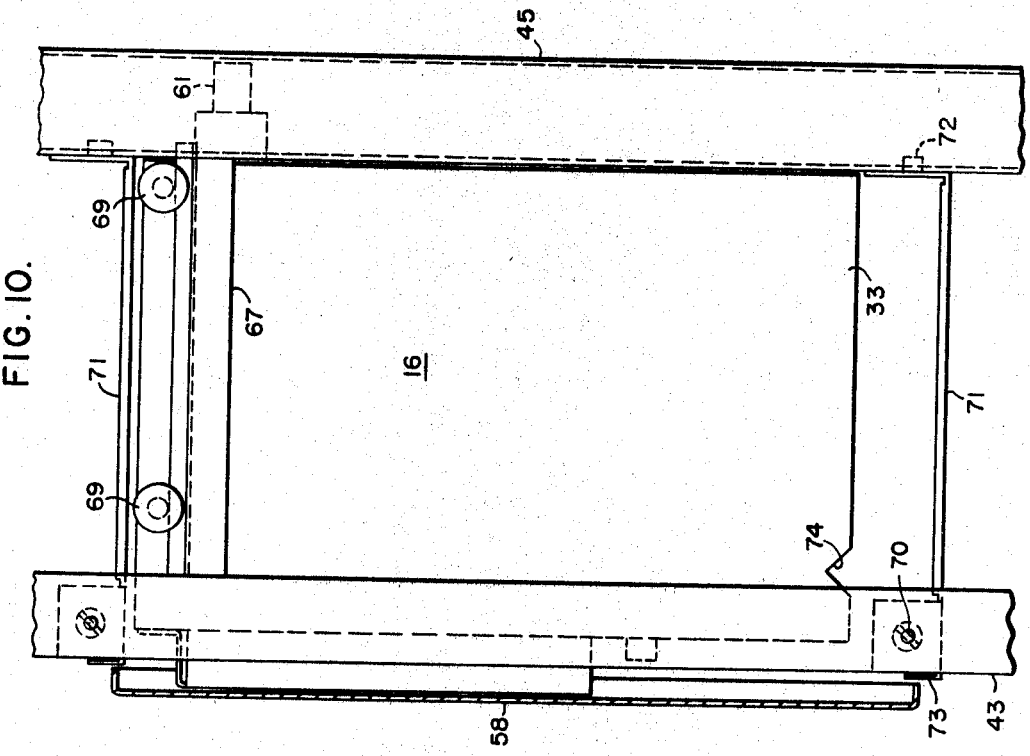

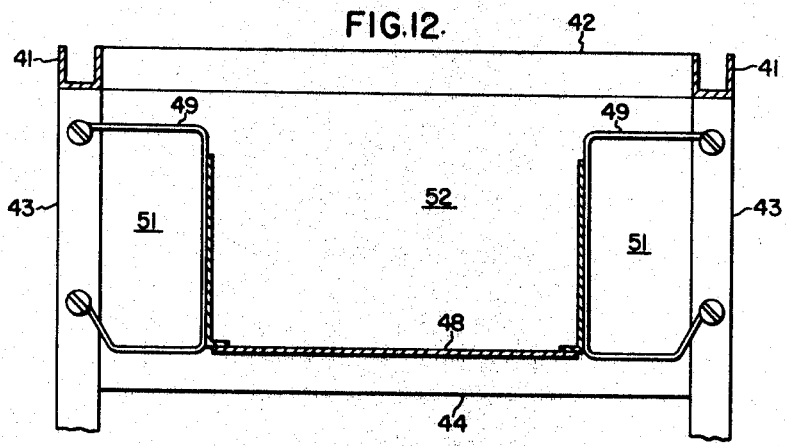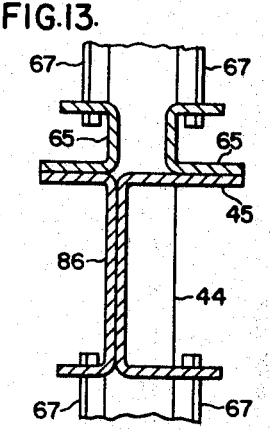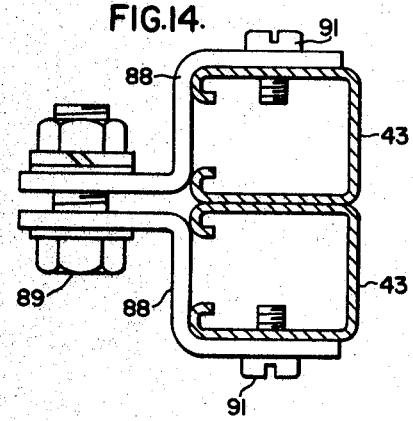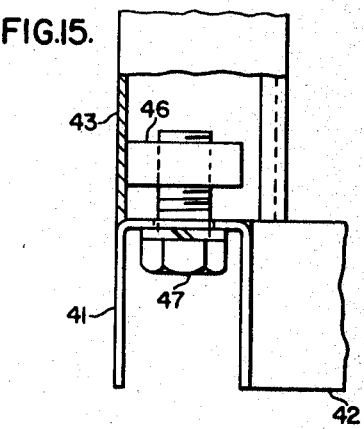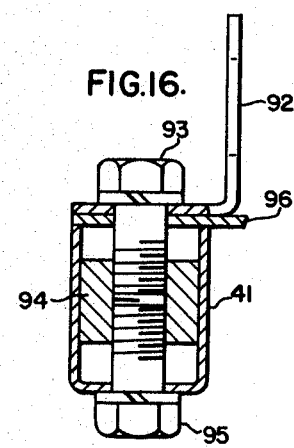

3,321,672
CONTROL CENTER HOUSING STRUCTURE
Edmund W. Kuhn and Wesley L. McKeithan, Pittsburgh, Pa., assignors to Westinghouse Electric Corporation, Pittsburgh, Pa., a corporation of Pennsylvania
Filed Dec. 31, 1964, Ser. No. 422,850
10 Claims. (Cl. 317—120)

This invention relates, generally, to switchboards and, more particularly, to switchboards of the type known as control centers utilized for housing control apparatus, such as motor control units.

Heretofore, a control center has comprised one or more individually enclosed housing sections, of cubicles, each one of which contained a plurality of removable control units. The housing sections were usually installed in side-by-side relation, although occasionally other arrangements were utilized. Each housing section had a vertical wiring trough inside the housing for containing wires connected to the control units in the one housing section only. The side sheets on each housing prevented wires from being connected to apparatus in adjacent housing sections. Also, supplying side sheets on adjacent sides of a row of housing resulted in double-wall partitions between housings and an uneconomical use of sheet steel.

An object of this invention is to provide a simplified and economical control center structure which may be built in standardized sizes containing from one to a predetermined number, for example, six, vertical compartments each one of which contains control units sized in vertical increments of a predetermined dimension for example, six inches.

Another object of the invention is to provide a vertical wireway which is separate from all unit compartments and which extends the full depth of the control center to be accessible from both the front and the rear of the control center.

A further object of the invention is to provide a control center in which at least part of the vertical wireways are common to two adjacent unit compartments.

Still another object of the invention is to provide a control unit which can be wired from wireways located at either or both sides of the unit.

A still further object of the invention is to provide dividing pans between the vertically disposed control units in a compartment which pivotally support the units in a tilted position to facilitate wiring the units, and provide closure surface for adjoining doors.

Another object of the invention is to provide frames for the vertical compartments which are common to two adjacent compartments and which support adjacent control units.

A further object of the invention is to construct the vertical frames to provide unobstructed space at both the top and the bottom of the control center for horizontally disposed conductors and incoming lines.

Another object of this invention is to provide for joining vertical unit compartments of different depths without requiring a transition compartment between the unit compartments.

Other objects of the invention will be explained fully hereinafter or will be apparent to those skilled in the art.

In accordance with one embodiment of the invention, individual vertical frames, each one of which includes two spaced vertical members tied together by two spaced horizontal members, are attached to horizontal rectangular top and bottom frames to provide vertical unit compartments and separate vertical wireways between certain unit compartments. At least part of the wireways serve control units in compartments at each side of the wireway. Terminal blocks are so located across the front of each control unit that wires coming from either side can be readily connected to the terminal blocks. The control units are slidable supported on horizontal rails extending between a vertical frame member and a vertical supporting chamber member attached to the horizontal members of the vertical frames. The control units are sized in 6-inch increments vertically from 12 to 72 inches in height. The top and bottom frames are punched to receive the vertical frames at 4½-inch spacings horizontally. Therefore, the vertical compartments can vary in width in 4½-inch increments. The standard vertical compartment is 13½ inches wide, and the standard wireway is 4½ inches wide. Two depth dimensions are provided, 15 and 20 inches. The 15-inch depth provides compartments for units mounted in the front only. The 20-inch depth is supplied when units are mounted back-to-back and are connected to a common vertical bus. The common wireway extends the full depth of the compartment for either front or back-to-back mounting.

For a better understanding of the nature and objects of the invention, reference may be had to the following detailed description, taken in conjunction with the accompanying drawings, in which:

FIG. 2 is a view, in rear elevation, of a portion of the structure shown in FIG. 1;

FIG. 3 is a view, in side elevation, of the structure shown in FIG. 1;

FIG. 4 is a view, in rear elevation, of the structure shown in FIG. 1, parts of the structure being removed for clearness;

FIG. 5 is a view, in perspective, of the supporting framework for the structure shown in FIG. 1;

FIG. 10 is an enlarged view, partly in side elevation and partly in section, of a control unit and supporting structure;

FIG. 11 is a view, similar to FIG. 10, showing the control unit in a tilted position;

FIG. 12 is a detail view of the horizontal bus compartment and wiring troughs at the top of the control center;

Figure 17:
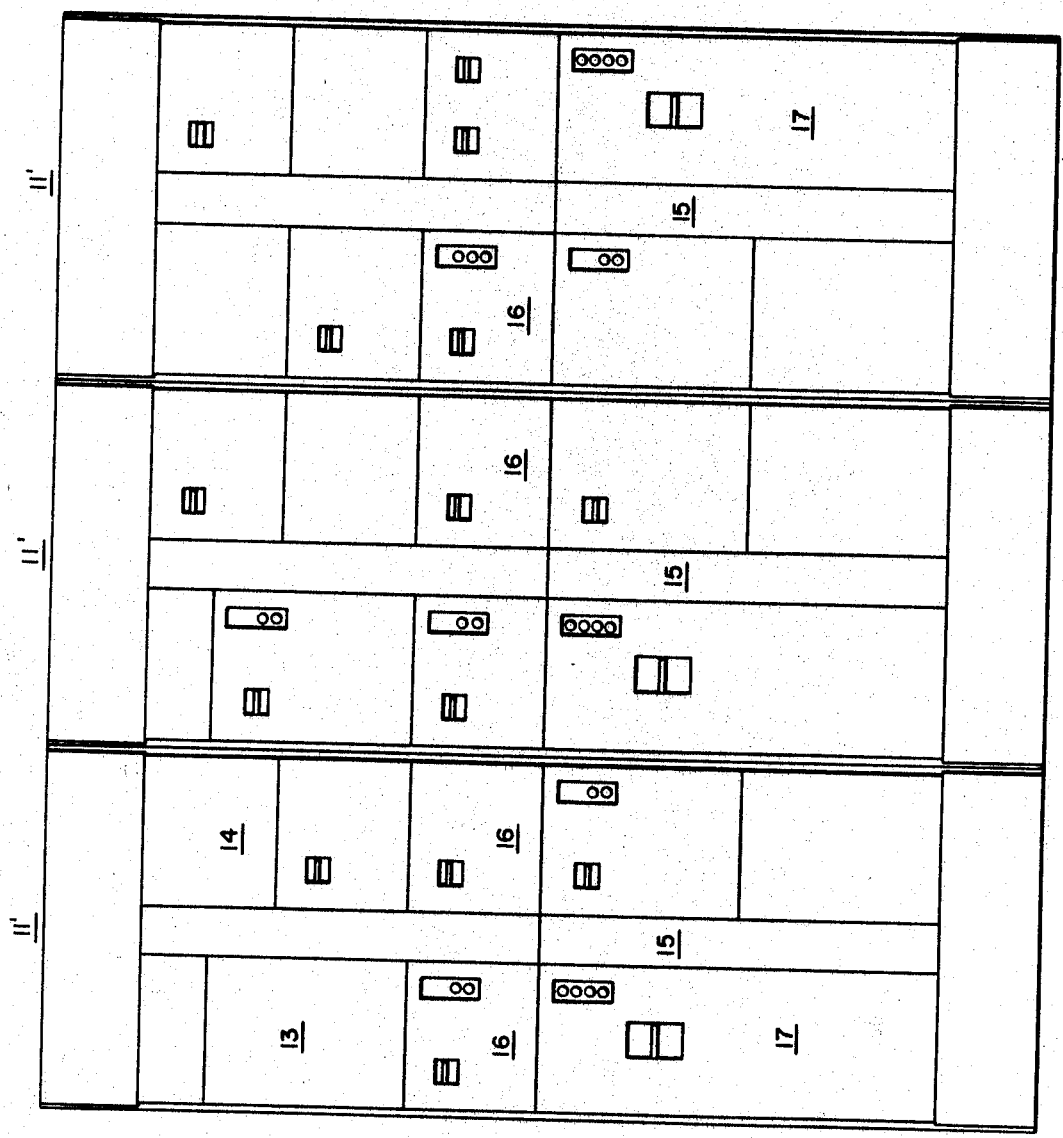

FIGS. 13, 14, 15 and 16 are detail views of structural features of the control center, FIGS. 14 and 15 being taken along lines XIV—XIV and XV—XV, respectively, in FIG. 5 and FIG. 16 being taken along line XVI—XVI in FIG. 2; and FIG. 17 is a view, in front elevation, of a control center having six vertical unit compartments and three vertical wireways, and which may be divided into three sections for shipping purposes.

Figure 1:
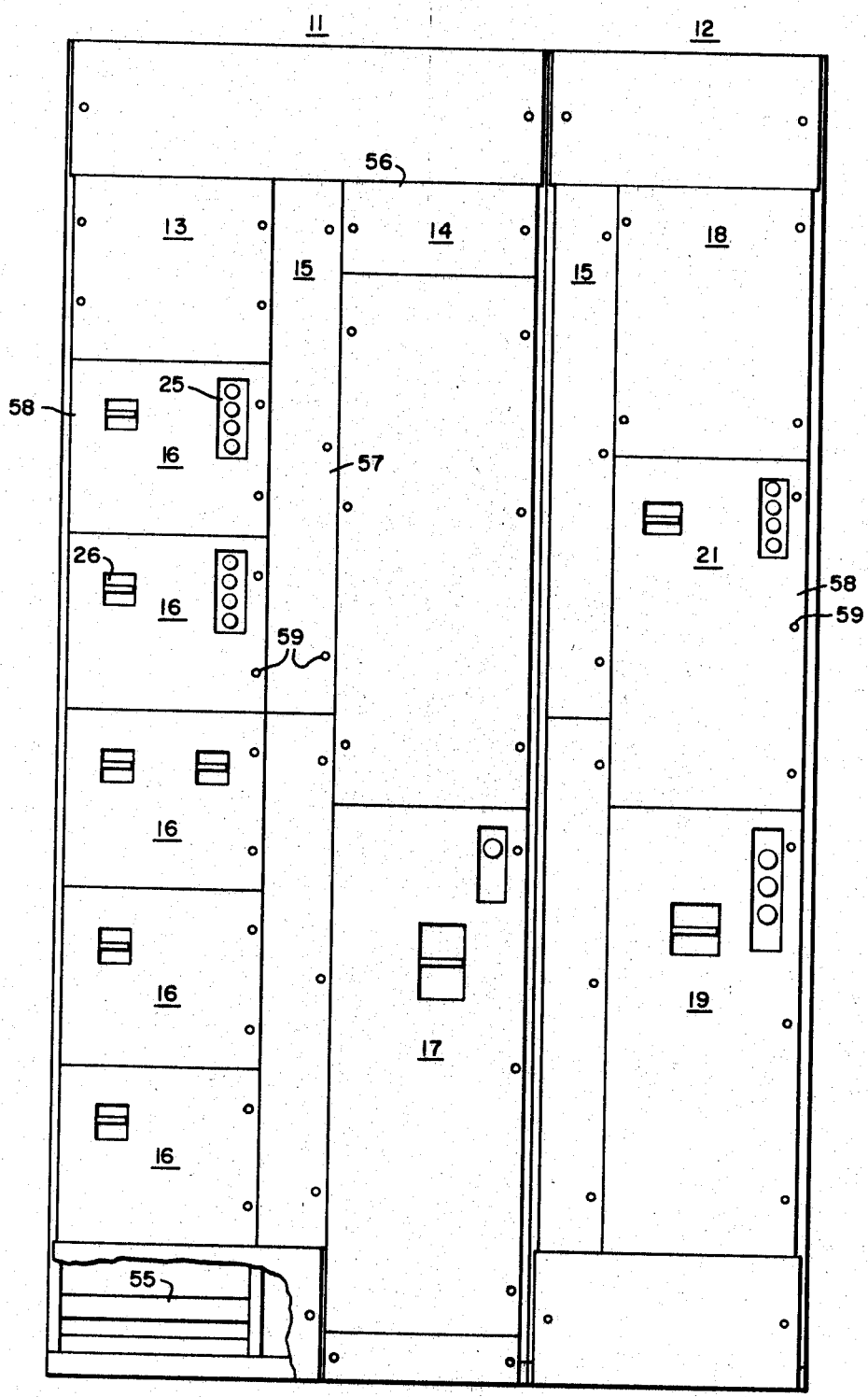
FIGURE 1 is a view, in front elevation, of a control center embodying features of the invention.

Referring to the drawings, and particularly to FIG. 1, the control center shown therein comprises two sections 11 and 12 which are disposed in side-by-side relation. The section 11 includes two vertical unit compartments 13 and 14 having a separate vertical wireway 15 disposed between the two unit compartments, thereby being common to both compartments. The vertical compartment 13 contains five control units 16 with space at the top for an additional control unit similar to the units 16. The vertical compartment 14 contains a relatively large control unit 17 with space at the top for additional control units.

Figure 9:
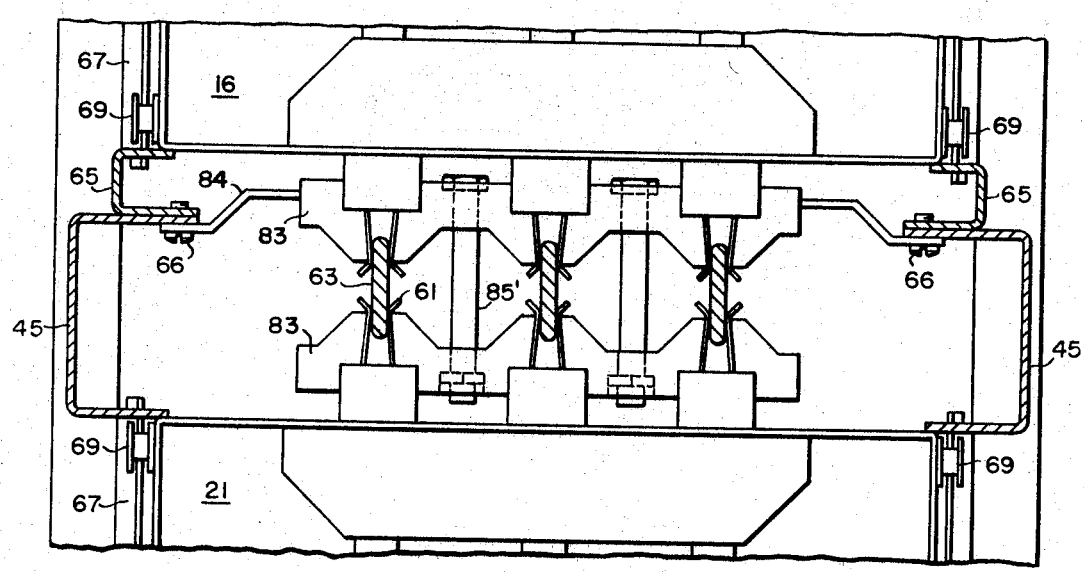
FIG. 9 is a view, similar to FIG. 8, showing control units mounted in the front and the rear of a unit compartment in back-to-back relation.

The section 12 includes a vertical unit compartment 18 with a separate wireway 15 disposed adjacent the compartment 18. As shown more clearly in FIG. 6, the compartment 18 is of sufficient depth to contain control units in both the front and the rear of the compartment. Control units 19 and 21 are mounted in the front of the compartment 18 with space at the top for an additional control unit. As shown in FIG. 2, control units 16 are mounted in the rear of the compartment 18 with spaces at the top and the bottom for additional control units. As shown in FIG. 9, the control units in the front and the rear of the vertical compartment 18 are mounted back-to-back.

Figure 7:
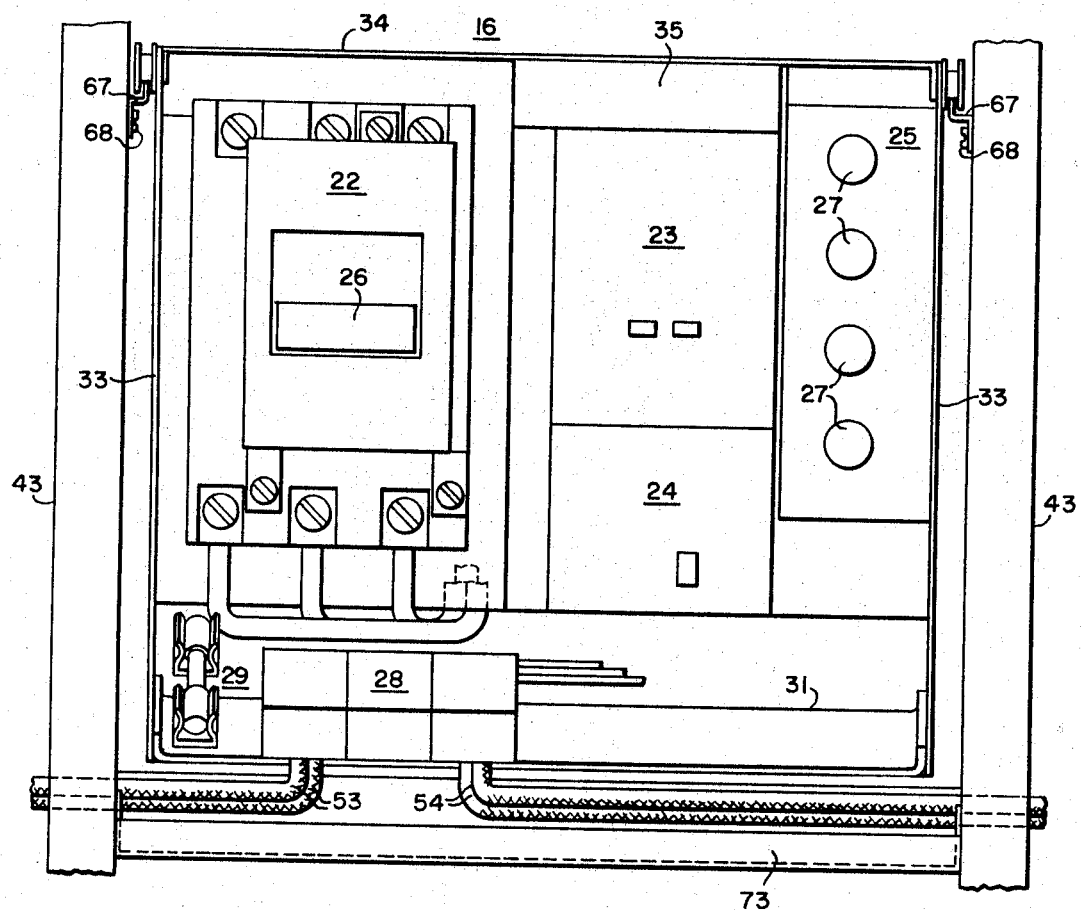
FIG. 7 is an enlarged view, in front elevation of one of the control units mounted on its supporting rails in the control center structure.

As shown in FIG. 7, the particular control units illustrated in the present drawing are motor starter units, each unit comprising a disconnecting device 22, a motor starting device 23, an overload relay 24 and a control panel 25. The disconnecting device 22, is preferably an automatic circuit breaker having an operating handle mechanism 26 mounted thereon. Other disconnecting devices, such as a switch and fuse assembly, may be utilized if desired. The motor starting device 23 and the overload relay 24 may be of a type well known in the art. The control panel 25 may be of a type described in patent No. 2,997,629 issued Aug. 22, 1961, to J. C. Wolski and assigned to the Westinghouse Electric Corporation. As shown, the panel 25 contains push-button switches 27. Other apparatus, such as indicating lights, may be mounted on the panel 25 if desired. A terminal block assembly 28 and a fuse assembly 29 are mounted at the front of the control unit on a tie bar 31.

Figure 8:
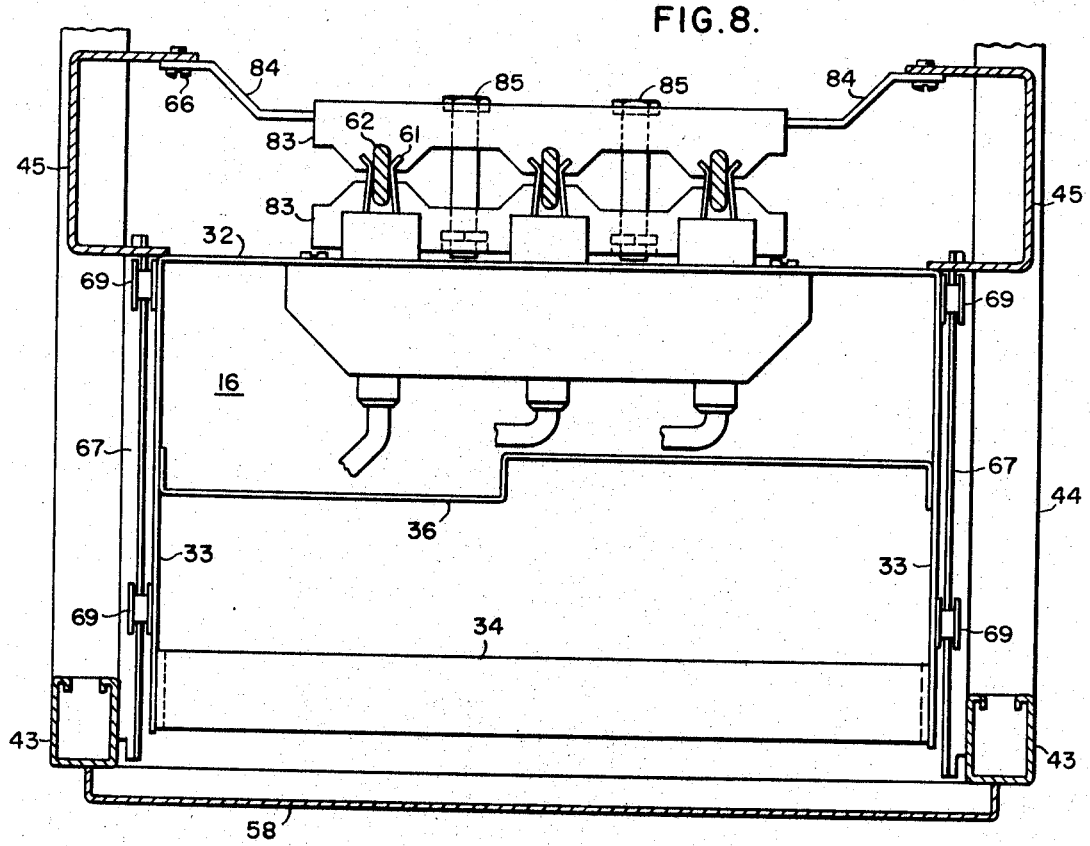
FIG. 8 is an enlarged view, partly in plan and partly in section, showing a control unit mounted in the front of a unit compartment of the control center.

As shown more clearly in FIG. 8, each control unit comprises a wrapper of sheet metal having a back portion 32 and side portions 33. The control unit is open at the top and the bottom. The side portions 33 are tied together at the front by the tie bar 31 which is located at the bottom of the unit and a tie bar 34 located at the top of the unit. A handle portion 35 is formed integrally with the tie bar 34. The devices 22, 23 and 24 are mounted on a pan 36 which is disposed vertically between the sides 33 and attached to the sides. The control units are mounted centrally with respect to the vertical center line of the compartment, thereby facilitating wiring from either side of the control unit.

Heretofore, control centers have been assembled by bolting together 20-inch-wide modular sections or cubicles. If additional space was needed, it was necessary to add a full 20-inch-wide cubicle, or fabricate a special cubicle to provide the space required. As shown more clearly in FIG. 5, the present control center utilizes standardized structures with a single top frame and a single bottom frame. Individual vertical frames separate the vertical compartments and vertical wireways. The top and bottom frames are punched to receive the vertical frames at predetermined incremental spacings, for example, 4½-inches. Therefore, the vertical compartments can vary in width in 4½ inch increments. In the present structure the standard vertical compartment is 13½ inches wide, and the standard wireway is 4½ inches wide. Unit compartments can be wider or narrower than the standard for special applications as required. The vertical wireways can be expanded to 9 inches or more where necessary.

As shown in FIG. 5, the section 11 of the control center includes a generally rectangular horizontally disposed top frame 37, a similar bottom frame 38 and four vertical frames 39. The top and bottom frames each include two longitudinal channel members 41 and two cross channel members 42 which may be welded together to form a rectangular frame. Each vertical frame includes two vertical channel members 43 and two horizontal cross members 44 which are spaced predetermined distances from the top and the bottom of the vertical frame. The channel members of the vertical frames may be welded together. Vertical supporting channels 45 extend between the cross members 44 of certain vertical frames and are welded to the cross members. One leg of each channel member 45 is slightly longer than the other leg. The channel members 45 support vertical bus bars and the control units as will be explained more fully hereinafter. As shown more clearly in FIG. 15, each vertical member 43 may be attached to a horizontal member 41 by means of a nut 46 which may be welded inside the channel member 43 and a bolt 47 which extends through the base of the channel member 41 and is threaded into the nut 46.

Control units are available in vertical increments of 6 inches. The smallest unit housing is 12 inches high. Each vertical compartment provides 72 inches of unit space to accommodate up to 6 control units. The total control center height is 90 inches. Thus, as shown in FIG. 5, an unobstructed horizontally extending space or area is provided across the top of the control center above the cross members 44. A similar area is provided below the cross members 44 at the bottom of the control center. This free space may be utilized for horizontal bus bars and for horizontal wires. The usual practice is to locate the horizontal bus bars at the top of the control center and to locate conduits containing incoming cables and wires at the bottom of the control center. The free space throughout the entire base of the control center makes the location of all conduit terminations less critical. The conduit terminations can be brought in anywhere within the outline floor dimensions of the control center, thereby making the installation simpler and faster.

As shown more clearly in FIG. 12, unobstructed space is provide at the top of the control center for cross panel wiring and for horizontal bus bars. A barrier assembly 48 may be attached to upright members 43 by wire brackets 49, thereby providing two isolated wiring troughs 51 and a horizontal bus compartment 52.

The vertical wireways 15 are separate from the vertical unit compartments. As shown in FIG. 1, one wireway 15 may be common to two vertical compartments 13 and 14 or a wireway 15 may be provided for each vertical compartment depending upon the requirements of the user of the control center. Considerable floor space can be saved by utilizing one wireway to serve two adjacent unit compartments. As previously explained, the terminal blocks 28 are mounted across the front of each control unit. Thus, the control units are of the universal type, that is wires may be connected to the terminal blocks from either side of the control unit as indicated by the wires 53 and 54 in FIG. 7. Thus, one wireway may be utilized to serve control units located at both sides of the wireway. Space is provided underneath the sides 33 of the control unit for the wires coming from the wireways.

As shown in FIG. 1, a master terminal board 55 may be located in the space at the bottom of the control center. Wires from the incoming conduits may be connected to the terminal board 55 and, likewise, the wires in the wireways 15 may be connected to the terminal board, If desired, a similar terminal board may be located in a space 56 at the top of the unit compartment 14. An extension of vertical supporting channels 45 into lower free space provides a full 72 inch unit space (see FIG. 1). Hinged doors 57 may be provided for the wireways 15. Likewise, hinged doors 58 may be provided for the unit compartments. The doors may be retained closed by captive fasteners 59.

In the present structure, two depth dimensions are available, 15 and 20 inches. The standard depth is 15 inches and provides compartments for units mounted in the front only. The control units have stab connectors 61 which engage vertical bus bars 62 as shown in FIG. 8. The 20-inch depth is used when units are mounted back-to-back. The back-to-back units engage common vertical bus bars 63 as shown in FIG. 9. In both cases, the common wireways 15 extend the full depth of the compartments, thereby providing increased wireway cross section.

As shown in FIG. 5, the frames for the 20-inch depth section are similar to the frames for the 15-inch depth except that the horizontal cross members 42' and 44' are longer to provide the additional depth. The length of the horizontal frame members 41 and 41' depends upon the number of vertical compartments and vertical wireways to be provided in each section. The number of vertical compartments and vertical wireways in each section depends upon the user's requirements and shipping limitations.

The 20-inch compartment may also be utilized to house feeder breakers, current limiting reactors and other apparatus too large to be installed in the 15-inch compartments. Thus, the user has flexibility in specifying a variety of arrangements in the control center. The structure also permits future changes and additions to be made with maximum ease. Also, the full-depth feature permits access to the wireways from both front and back of the control center. Thus, two men can work simultaneously when installing the wiring.

As shown in FIGS. 5 and 9, when control units are to be installed back-to-back, additional channel members 65 are attached to the longer leg of the vertical channel members 45 by screws 66. The channel members 65 are similar to the members 45 except they are of a smaller size. For back-to-back mounting of the control units the channel members 45 are slightly off-center with respect to the distance between the front and the back of the unit compartments.

As shown in FIGS. 7, 8 and 9, the control units are supported in a horizontal position by horizontally mounted rails 67. In the case of front mounted control units the rear end of each rail 67 extends through an opening in the short leg of a vertical channel member 45. The front end of each rail is attached to a vertical frame member 43 by a screw 68. In the case of rear mounted control units, the one end of each rail 67 extends through an opening in the short leg of the vertical channel member 65. The other end of each rail 67 is attached to a vertical frame member 43. The openings in the vertical channels for the rails are spaced vertically on 6-inch centers. Spool-like members 69 are riveted to the sides 33 of the control units to support them on the rails 67. The control units may be installed in the control center by sliding them on the rails 67 to engage the stab connectors 61 with the vertical bus bars.

As shown in FIGS. 10 and 11, unit divider pans 71 are provided between the control units. The rear end of each pan 71 is supported by a projection 72 which extends through an opening in the short leg of a vertical channel member 45. The front end of each divider pan is attached to a vertical frame member 43 by a screw 70. Each pan 71 has an upwardly extending flange 73 across its front. A notch or recess 74 is provided in each side 33 of the control unit 16, or any of the other sizes of control units. When the control unit is withdrawn outwardly, a sufficient distance to permit the front pair of supporting rivets 69 to leave the rails 67 the control unit may be tilted to the position shown in FIG. 11 with the flange 73 on the divider pan 71 disposed in the notch 74 and the top rear corners 75 of the control unit engaging the divider pan 71 located above the control unit. In this position, the stab connectors 61 are disengaged from the vertical bus bars and the control unit is in a position to facilitate the making of wiring connections to the control devices on the unit. The control unit is supported by the flange 74 and is retained in the tilted posittion by the corners 75 engaging the pan 71 above the unit. Thus, the divider pans effectively close the top and the bottom of each control unit as well as support the unit when in a tilted position. They also provide a closure surface for compartment doors.

Figure 6:
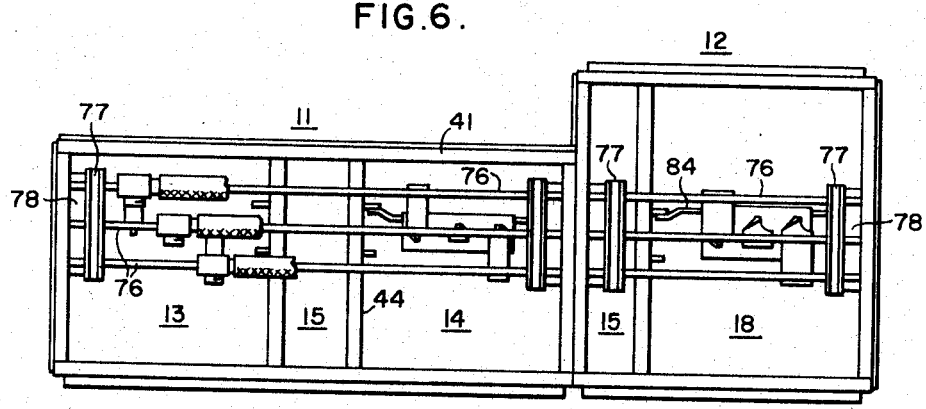
FIG. 6 is a view, in top plan, of the structure shown in FIG. 1, the top cover plate being removed.

As shown in FIGS. 4 and 6, horizontal bus bars 76 are disposed across the top of the control center. The bus bars are retained in position by insulators 77 supported by brackets 78 attached to the cross members 44 of the vertical frames. The bus bars 76 may be joined by splice plates 79 where they are to be separated for shipping purposes. Power cables 81 are connected to the bus bars 76 by terminal lugs or connectors 82. The power cables 81 may be brought in through conduits at the bottom of the control center and run upwardly through a wireway 15 as shown, or they may be brought in through the top of the control center. As shown in FIG. 6, the horizontal bus bars 76 for sections 11 and 12 are in line and can be continuous unless they have to be separated for shipping purposes.

The upper ends of the vertical bus bars 62 and 63 may be bolted to the horizontal bus bars 76. The vertical bus bars are supported by insulators 83 which, in turn, are supported by straps 84 attached to the long legs of the vertical channel members 45. As shown in FIG. 8, when the narrow bus bars 62 are utilized for front mounted control units only, the strap 84 is mounted in a position to space the insulators 83 properly for the narrow bus bars. The two insulators 83 of each pair of insulators are drawn together by bolts 85 extending through the insulators.

As shown in FIG. 9, when the wider bus bars 63 are utilized for control units mounted back-to-back, the strap 84 is mounted in a position to space the insulators 83 properly for the wider bus bars. The two insulators of each pair are drawn together by bolts 85'.

When no wireway is provided between two adjacent control compartments, a vertical channel member 86 is attached to the vertical channel 45 in back-to-back relation as shown in FIG. 13. The channel 86 is similar to the hcannel 45 except that the legs of the channel 86 are shorter than the corresponding legs of the channel 45. As also shown in FIG. 13, an additional channel 65 is attached to the channel 86 when the control units are mounted back-to-back. The channels 86 and 65 are utilized to support the control units and vertical bus bars in the manner hereinbefore described.

As explained hereinbefore, shipping limitations require that control centers be divided into sections of a suitable size for shipping. In the present structure the dividing line is between the sections 11 and 12 where two vertical frames 39 are joined together. As shown in FIG. 5, the horizontal members 42 and 42' of the top frames 37 and 37' and the bottom frames 38 and 38', respectively, may be connected together by bolts 87. The two adjoining vertical members 43 at the front of the control center may be clamped together by two clamping members 88 which are drawn together by a bolt 89. Each clamping member 88 may be attached to one of the vertical members 43 by a screw 91 as shown in FIG. 14. Thus, the sections 11 and 12 may be separated for shipping purposes by removing the bolts 87 and 89.

As shown in FIGS. 2 and 3, angle-shaped lifting lugs 92 may be attached to the top of the control center. As shown more clearly in FIG. 16, each lifting lug 92 may be attached to a horizontal frame member 41 by means of a bolt 93 threaded into a nut 94 retained in position in the member 41 by a bolt 95 threaded into the bottom half of the nut 94. The bolt 93 extends through a top plate 96 on the control center. In this manner, the lugs 92 may be attached or removed from the exterior of the control center without gaining access to the inside of the structure.

End plates 97 may be removably attached to each end of the structure by screws 98. As shown in FIGS. 2 and 3, a plate 99 may be attached at the rear of the structure to fill in the gap resulting from the difference in depth between the two sections 11 and 12.

As shown in FIG. 17 three sections 11' are disposed in side-by-side relation. The sections may be separated from each other in the manner hereinbefore described for shipping purposes. Since each vertical wireway 15 serves two adjacent vertical control compartments the structure has a minimum number of wireways, thereby requiring a minimum amount of floor space. Numerous other combinations of control compartments and wireways may be provided as desired.

From the foregoing description it is apparent that the invention provides a structure having features of safety, accessibility, flexibility and simplicity not found in prior control centers. The structure may be economically manufactured and installed.

Since numerous changes may be made in the above-described construction and different embodiments of the invention may be made without departing from the spirit and scope thereof, it is intended that all subject matter contained in the foregoing description or shown in these accompanying drawings shall be interpreted as illustrative and not in a limiting sense.

We claim as our invention:

1. A control center for housing control units, said control center comprising horizontally disposed rectangular top and bottom frames, at least three individual vertical frames attached to the top and bottom frames in horizontally spaced relation to provide a vertical unit compartment between two of said vertical frames and a separate vertical wireway between one of said two vertical frames and a third vertical frame, each vertical frame including two horizontally spaced vertical members tied together by two horizontal members spaced from each other and from the ends of the vertical members, vertical supporting channel members attached to the horizontal members of the vertical frames, vertically spaced horizontal rails supported by the channel-members for supporting control units of a predetermined height and a predetermined increment of the height, and said channel members having openings therein vertically spaced at said increment for determining the location of the vertically spaced rails.

2. A control center comprising horizontally disposed rectangular top and bottom frames, individual vertical frames attached to the top and bottom frames in horizontally spaced relation to provide vertical unit compartments and separate vertical wireways, at least one of said vertical frames being common to a vertical unit compartment and a vertical wireway, at least one of the wireways being common to two vertical unit compartments, said wireways extending the full depth of the unit compartments to be accessible from the front and the rear of the control center, control units centrally mounted in the unit compartments, and terminal blocks mounted at the front of each control unit for connecting wires from wireways located at either side of the control unit.

3. A control center comprising horizontally disposed rectangular top and bottom frames, individual vertical frames attached to the top and bottom frames in horizontally spaced relation to provide vertical unit compartments between the vertical frames, vertical bus bars disposed in said compartments, control units removably disposed in said compartments with connectors thereon engaging said bus bars, vertically spaced rails on said vertical frames for slidably suporting the control units in a horizontal position, divider pans disposed between the control units, a flange on the front of each divider pan, and recesses in bottom edges of the control units cooperating with said flanges to support the control units in a tilted position with the connectors disengaged from the bus bars.

4. A control center comprising horizontally disposed rectangular top and bottom frames, individual vertical frames attached to the top and bottom frames in horizontally spaced relation to provide vertical unit compartments between the vertical frames, vertical bus bars disposed in said compartments, control units removably disposed in said compartments with connectors thereon engaging said bus bars, each control unit comprising a frame which is closed at the sides and back and open at the front the top and the bottom, vertically spaced rails on the vertical frames for slidably supporting the control units in a horizontal position, divider pans disposed between the control units to effectively close the tops and the bottoms of the control units in the compartments, and said pans pivotally supporting the control units in a tilted position with the connectors disengaged from the bus bars.

5. A control center for housing control units, said control center comprising horizontally disposed vertically spaced rectangular top and bottom frames, individual vertical frames attached to the top and bottom frames in horizontally spaced relation to provide vertical unit compartments and separate vertical wireways, at least one of said vertical frames being common to a vertical unit compartment and a vertical wireway, at least one of the wireways being common to two vertical unit compartments, each vertical frame including two spaced vertical members tied together by two horizontal members spaced from each other and from the ends of the vertical members, vertical supporting channel members attached to the horizontal members of the vertical frames, said channel members terminating at said horizontal members to provide unobstructed horizontally extending areas across the top and the bottom of the control center for receiving electrical conductors, and vertically spaced rails supported by the channel members for supporting control units in the unit compartments.

6. A control center for housing control units, said control center comprising a plurality of generally channel-shapel members secured together to form a horizontally disposed rectangular top frame, a horizontally disposed rectangular bottom frame spaced from the top frame, individual vertical frames attached to the top and bottom frames in horizontally spaced relation to provide vertical unit compartments between vertical frames and separate vertical wireways adjacent at least part of the unit compartments, a nut disposed in one of the channel-shaped members of the top frame, a bolt threaded into the bottom portion of the nut from the bottom of the frame to retain the nut in position, a plate on top of the frame, a lifting lug on top of the plate, and another bolt threaded into the top portion of the nut from above the plate to attach the lug to the frame for enabling lifting the control center.

7. A control center for housing control units, said control center comprising horizontally disposed vertically spaced rectangular top and bottom frames, individual vertical frames attached to the top and bottom frames in horizontally spaced relation to provide vertical unit compartments between vertical frames and separate vertical wireways adjacent at least part of the unit compartments, additional top and bottom frames adjoining one end of the first-named top and bottom frames, additional vertical frames attached to the additional top and bottom frames to provide additional vertical unit compartments and additional separate wireways, an end one of the additional vertical frames adjoining an end one of the first-named vertical frames, a clamping member attached to each one of said adjoing frames, a bolt for drawing said clamping members together, and said bolt being removable to permit separation of the frames for enabling shipping of the control center in sections.

8. The control center defined in claim 1, said channel members having openings therein vertically spaced at said increment for receiving one end of said rails, the other end of said rails, being attached to vertical members of the vertical frames.

9. The control center defined in claim 3, vertical channel members attached to said vertical frames, said channel members having vertically spaced openings therein for receiving projections on the inner ends of said pans, and the outer ends of said pans being attached to said vertical frames.

10. The control center defined in claim 4, doors hinged on the vertical frames for closing the unit compartments, a flange on the front of each divider pan, and said flanges forming closure surfaces for said doors.

References Cited by the Examiner
UNITED STATES PATENTS

| | | | |
|---|---|---|---|
| 2,196,399 | 4/1940 | Rubel | 317—120 X |
| 2,394,060 | 2/1946 | Holmes | 317—120 X |
| 2,480,568 | 8/1949 | Gawin | 317—120 |
| 3,066,244 | 11/1962 | Defendorf et al. | 317—120 |
| 3,142,003 | 7/1964 | Olashaw | 317—120 |

ROBERT K. SCHAEFER, *Primary Examiner.*

W. C. GARVERT, H. O. JONES, J. R. SCOTT,
*Assitant Examiners.*